United States Patent [19]

Bull

[11] Patent Number: 4,696,320
[45] Date of Patent: Sep. 29, 1987

[54] PRESSURE CONTROL VALVE WITH PUSH-PULL LOCKING ADJUSTMENT KNOB

[75] Inventor: Walter E. Bull, Aurora, Colo.

[73] Assignee: Wilkerson Corporation, Englewood, Colo.

[21] Appl. No.: 938,484

[22] Filed: Dec. 5, 1986

[51] Int. Cl.⁴ ............................................. G05D 11/00
[52] U.S. Cl. .................... 137/116.5; 137/505;
 137/505.42; 251/337; 267/177
[58] Field of Search ................ 137/116.5, 505, 505.42,
 137/524; 251/337; 267/177; 74/424.8 UA;
 70/183

[56] References Cited

U.S. PATENT DOCUMENTS

| 2,339,407 | 1/1944 | Horton | 137/505 |
| 2,908,288 | 10/1959 | Carr | 137/524 X |
| 3,631,878 | 1/1972 | Horst | 137/116.5 X |
| 4,282,766 | 8/1981 | Huber | 137/505.42 X |

FOREIGN PATENT DOCUMENTS 1445110  8/1976  United Kingdom ............. 137/116.5

Primary Examiner—Harold W. Weakley
Attorney, Agent, or Firm—Ralph F. Crandell

[57] ABSTRACT

A pressure regulating valve with a push pull adjusting knob includes a valve body housing a valve member defining an annular seat adapted for engagement with a knife edge seat on a valve sleeve insert. The valve member is opened and closed by a flexible diaphragm operating mechanism, the diaphragm being exposed on one side to outlet valve pressure and on its opposite side to the atmosphere and a valve control spring. A valve stem rotatably mounted in a valve bonnet adjusts a valve nut for varying the compression of the spring, and thereby the spring force on the diaphragm. A push-pull adjusting knob slidably and rotatably engages the valve stem. The knob is locked against the bonnet in one axial position and is released from the bonnet in the opposite axial position for rotating the valve stem. A detent between the valve stem and adjusting knob provides resistance to the adjusting knob movement, and knob movement is limited by a cap threadably engaged with the end of the adjusting screw. The adjusting knob and valve stem are operatively coupled by mating hexagonal surfaces. The knob is locked to the valve bonnet by mutually engaging splines or ribs.

9 Claims, 8 Drawing Figures

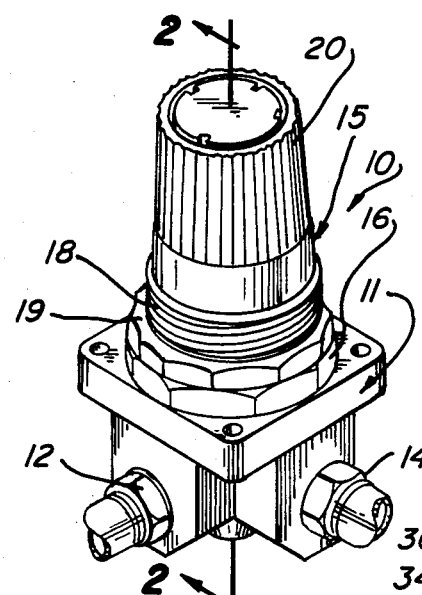
Fig_1
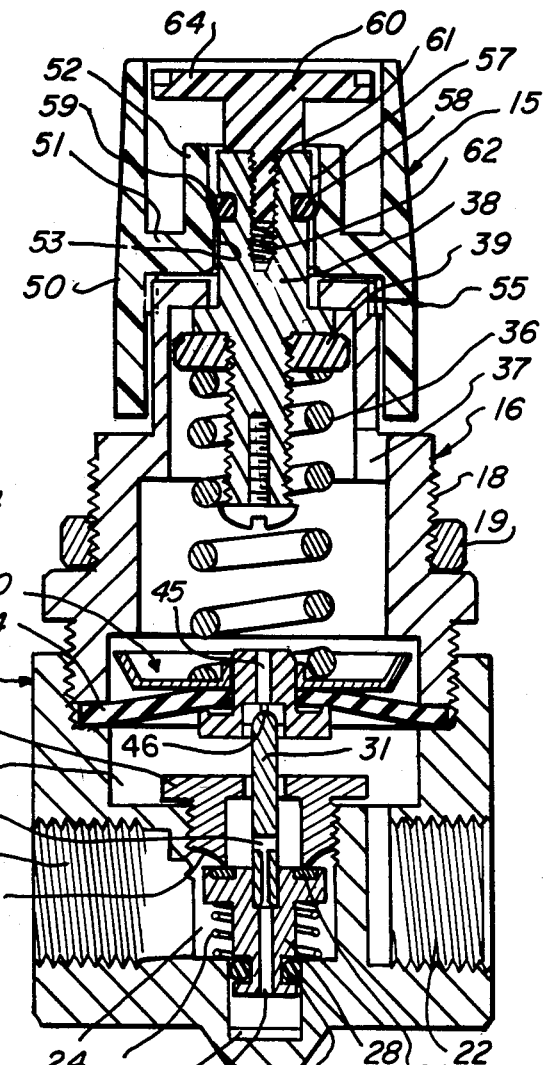
Fig_2
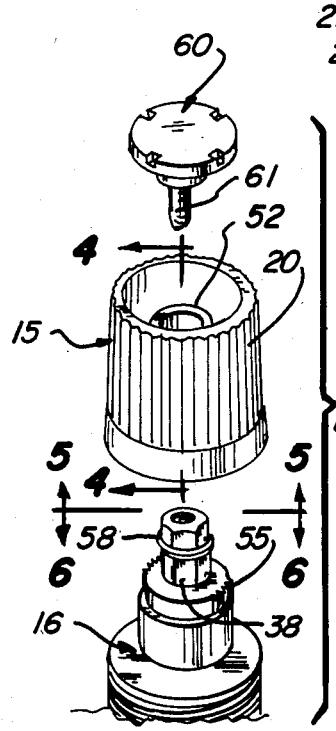
Fig_3
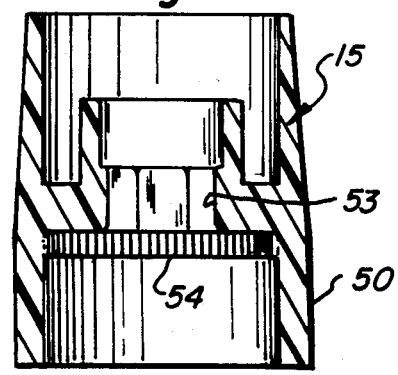
Fig_4

U.S. Patent  Sep. 29, 1987  Sheet 2 of 2  4,696,320
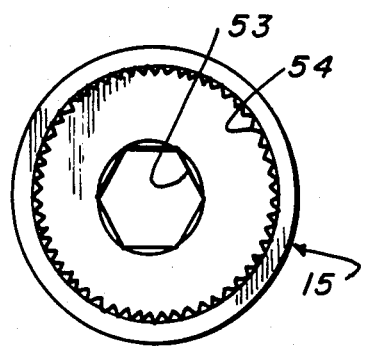
Fig_5
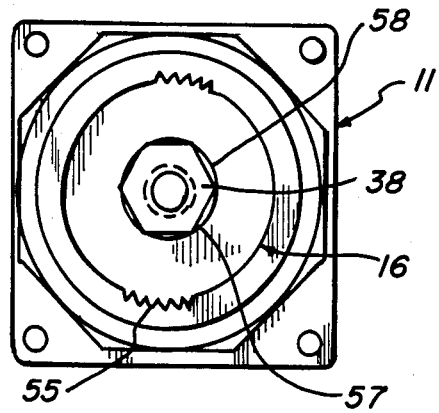
Fig_6
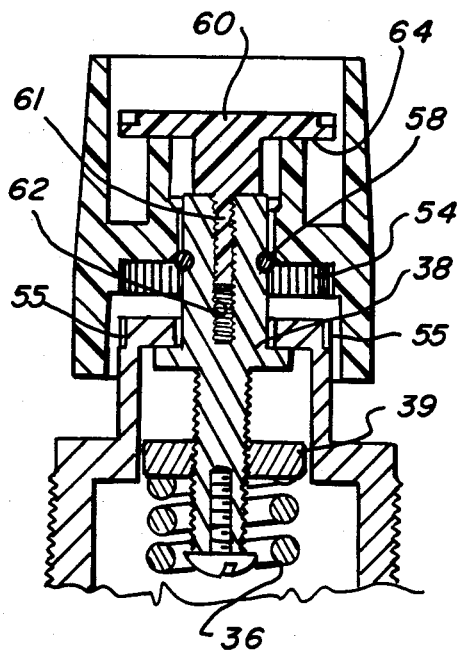
Fig_7
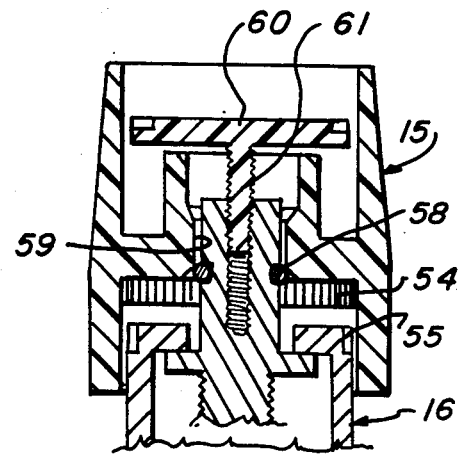
Fig_8

4,696,320

PRESSURE CONTROL VALVE WITH PUSH-PULL LOCKING ADJUSTMENT KNOB

BACKGROUND OF THE INVENTION

1. Field of the Invention

The present invention relates to pressure regulator valves for compressed gas lines and more particularly to pressure regulator valves finding particular but not necessarily exclusive utility for the control of compressed air. More specifically, the present invention relates to a new and improved locking control knob construction for compressed air regulator valves.

2. Description of the Prior Art

Adjustable pressure regulator valves for compressed air lines are ancient and well known in the art. Such valves are conventionally adjusted by a knob or handle by means of which the spring force of the main valve control spring can be varied thereby to vary the pressure output of compressed air from the control valve. For adjusting the spring pressure of the valve spring, there is conventionally provided a valve stem with an appropriate knob.

To prevent inadvertent adjustment of the valve by rotation of the valve stem, it has been the practice to provide a control knob which must be pushed or pulled to engage with the valve stem before the valve stem can be rotated. In its disengaged position the valve control knob can ordinarily be rotated freely without rotating the valve stem.

OBJECTS AND SUMMARY OF THE INVENTION

It is the principal object of the present invention to provide an improved knob or handle construction for a pressure regulator valve which knob or handle can be locked with respect to the valve body to prevent inadvertent operation of the valve.

A related object of the present invention is to provide a valve and valve handle having the foregoing characteristics in which the valve handle is slidable axially from a locked to an unlocked valve operating position.

A further object of the present invention is to provide a pressure regulator valve having a control knob which is axially slidable between active and inactive positions and, in a modified embodiment, can be secured in its locked position to prevent inadvertent or unauthorized operation.

Still another object of the present invention is to provide a pressure regulating valve and adjusting knob of the foregoing character which is attractive in appearance, rugged in use and yet relatively simple of construction.

Other objects and advantages of the present invention will become apparent as the following description proceeds taken in conjunction with the accompanying drawings.

In accordance with the present invention, there is provided a pressure regulator valve of the conventional diaphragm actuated balanced poppet type, wherein the diaphragm and poppet are biased by an adjustable coil spring. The spring pressure can be varied by expanding or compressing the spring through the use of a valve stem and adjusting nut. A handle or knob is provided for rotating the valve stem to adjust the spring pressure. The knob, in accordance with the present invention, is slidably mounted on the valve stem. In one extreme position, the knob is locked to the valve bonnet and prevented from rotating. In its other extreme position, the knob is free to rotate and thereby turn the valve stem to adjust the spring pressure and thereby regulate the pressure of the gas flowing through the valve.

The preferred embodiment of the present invention comprises a conventional pressure regulating valve having a compressible adjusting spring and a valve stem that is rotatable to adjust the spring force. The valve bonnet includes an upstanding sleeve portion having exterior ribs defining grooves or splines thereon. An adjusting knob is slidably mounted on the valve stem with an O-ring detent for holding the knob in a selected position. The knob includes a depending skirt surrounding the spline portion of the valve bonnet, with interiorly projecting ribs or splines on the skirt adapted for releasable engagement with the splines on the bonnet. When the knob is pushed or telescoped onto the valve stem, the skirt spline engages with the bonnet spline to prevent the knob from being rotated. By pulling on the knob, the knob slides axially on the valve stem to release the engaging splines and thereby allow the knob to rotate the valve stem to adjust the spring pressure. A cap on the end of the valve stem is engaged by an upstanding interior sleeve on the knob to prevent the knob from being completely withdrawn from the valve stem. The cap may be of the type which can be screwed down against the end of the valve stem when the knob is in the locked position to prevent the knob from being released. Such a configuration provides for an additional lock on the regulating valve.

DESCRIPTION OF THE DRAWINGS

FIG. 1 is an isometric elevation view of a regulator valve and locking knob embodying the present invention.

FIG. 2 is an enlarged cross-section view taken substantially in the plane of line 2—2 on FIG. 1.

FIG. 3 is an exploded partial view of the regulator and adjusting knob shown in FIG. 1.

FIG. 4 is an enlarged section view of the adjusting knob taken substantially in the plane of line 4—4 on FIG. 3.

FIG. 5 is a bottom plan view of the adjusting knob shown in FIG. 4.

FIG. 6 is a top plan view of the regulator shown in FIGS. 1 and 3 with the adjusting knob removed.

FIG. 7 is a partial cross-section view similar to the view shown in FIG. 2 but with the adjusting knob in rotatable valve adjusting position.

FIG. 8 is a section view similar to that shown in FIG. 7, but illustrating the use of a knob clamping screw and plate forming a modified form of the present invention.

DESCRIPTION OF THE PREFERRED EMBODIMENT

The present invention is embodied in a pressure regulating valve 10 finding particular but not necessarily exclusive utility for the regulation of the pressure of compressed air. The regulator valve 10 includes a valve body 11 into which an inlet line 12 and one or more outlet lines 14 are connected. The regulator 10 further includes an adjusting knob 15, which may be rotated for adjusting the output pressure in the output line 14. The adjusting knob 15 is positioned on a valve bonnet 16. For mounting the valve on a panel, the surface of the valve bonnet 16 is provided with exterior threads 18 onto which is screwed a panel mounting nut 19. The exterior surface of the adjusting knob 15 is provided with knurls or grooves 20 to facilitate gripping of the knob. In use, the knob is pulled outwardly away from the valve body 11 to its operative position wherein it may be rotated to adjust the valve output pressure. When the pressure adjustment is completed, the knob is pushed inwardly where it locks against further rotation.

The pressure regulator valve, shown in more detail in FIG. 2, comprises an internally threaded inlet chamber 21 in the valve body 11 adapted to receive the inlet conduit or line 12. An internally threaded outlet chamber 22 is adapted to receive one or more outlet lines or conduits 14. Intermediate the inlet chamber 21 and outlet chamber 22 is a valve chamber 24 receiving a valve sleeve 25 defining an annular knife-edge seat 26. A valve member or poppet 28 is reciprocally mounted in the valve chamber 24 and is provided with an annular seat 29 adapted to sealingly engage the valve knife-edge seat 26 on the sleeve 25 to prevent the flow of fluids, such as compressed air, through the valve body.

For actuating the valve 28 to the open or flow position, there is provided a spring biased diaphragm valve operating mechanism 30, operatively engaged with the valve 28 by a valve pin 31. The valve 28 is biased towards its closed position by a biasing spring 32, and is opened by axial movement of the spring biased diaphragm mechanism 30 acting on the valve 28 through the pin 31. The diaphragm mechanism includes a flexible diaphragm 34 secured to the valve body 11 by the valve bonnet 16. The diaphragm is positioned in a chamber 35 open to the outlet chamber 22, so that the diaphragm 34 is exposed to the outlet pressure of the gas or fluid in the outlet chamber 22.

On its opposite side, the diaphragm 34 is exposed to the atmosphere through an opening on port 37 in the valve bonnet 16. A pressure adjusting spring 36 on the atmosphere side of the diaphragm in opposition to the internal pressure in the outlet chamber 22 applies a force to the diaphragm tending to open the valve 28. By adjusting the spring pressure or force, the differential force between the spring 36 and the outlet pressure in the valve outlet chamber 22 determines whether the valve 28 is open or closed.

For adjusting the force exerted by the valve spring 36, an adjusting stem 38 is rotatably mounted in the valve bonnet 16 and threadably engaged with an adjusting nut 39. The nut 39 is hexagonal in shape and is slidably mounted in a hexagonal bore in the valve bonnet and engaged with the upper end of the adjusting spring 36. By rotating the valve stem 38 relative to the bonnet 16, the axial position of the adjusting nut 39 determines the compression of the main valve spring 36 and the force it exerts on the atmospheric side of the pressure diaphragm 34.

The pressure on opposite sides of the main valve 28 is equalized by appropriate passages 40, 41 through the valve member 28 and pin 31 respectively. The lower end of the valve member 28 is slidably received in a closed-end bore 42 in the valve body 11 and sealed with respect thereto by an O-ring 44.

In the event of an excessively large pressure build-up in the outlet chamber 22, pressure relief is provided by a relief valve passage 45 through the diaphragm mechanism 30. The relief passage 45 is normally closed by a rounded end 46 of the valve pin 31, which seallingly engages a valve seat 47 in the center of the diaphragm 34 surrounding the exhaust or relief passage 45. When fluid pressure in the outlet chamber 22 exceeds a predetermined maximum, the diaphragm 34 is forced away from the end of the valve pin 31, thereby allowing excess pressure fluid to escape through the exhaust passage 45 in the diaphragm mechanism.

The present invention is concerned primarily with the knob structure for rotating the valve stem 38 to adjust the force of the valve spring 36 and thereby the fluid pressure in the outlet chamber 22. This adjusting-knob mechanism is shown in detail in FIGS. 2 and 4 through 7. For this purpose, the adjusting knob 15 is generally sleeve-shaped in configuration, defining an intermediate, inwardly projecting annular shoulder 51 terminating at its inner-most edge in an inner valve stem engaging sleeve 52. The inner sleeve 52 slidably and rotatably engages the end of the valve stem and provides a construction whereby the adjusting knob may be axially or telescopingly movable relative to the valve stem while remaining rotationally engaged therewith. Engagement between the exposed end of the valve stem 38 and the internal knob sleeve 52 is by a hexagonal bore 53 in the sleeve, as shown in FIGS. 4 and 5, which slidingly engages a hexagonal surface 57 on the stem as shown in FIG. 6.

For locking the knob against rotational movement relative to the bonnet when the knob has been pushed onto the valve stem, a depending skirt portion 50 of the valve adjusting knob includes internally projecting teeth or ribs 54 defining an internal spline adapted to engage with an external spline or ribs 55 on the external surface of the bonnet 16, as shown in FIG. 7. The external spline or ribs 55 may extend either partially or fully around the circumference of the bonnet 16.

An O-ring detent 58 on the upper end of the valve stem 38 slidably and frictionally engages the internal surface of the internal sleeve 52 on the adjusting knob. This detent provides a friction positioning of the knob in either its extended or retracted position, and prevents the knob from inadvertently sliding from one position to the other.

For restricting the axial movement of the adjusting knob 15, a cap 60 having a depending threaded bolt portion 61 is engaged and secured to a threaded bore 62 in the upper end of the valve stem 38. The cap 59 is provided with a flange 64 adapted to engage the end of the inner knob sleeve 52 and limit the extent of axial travel of the adjusting knob 15. Additionally, the cap 59 may be configured to provide a lock preventing adjustment or axial movement of the knob 15, as shown in FIG. 8. In this embodiment, the threaded bolt 61 is extended so that the cap 60 may be screwed further onto the valve stem.

The adjusting knob 15 is shown in the locked position in FIG. 2. For adjusting the compression force of the valve spring 36, the knob is pulled axially outwardly, as shown in FIG. 7, and then rotated to rotate the valve stem 38 to position the compression nut 39 and thereby adjust the compression force of the spring 36, as shown in FIG. 7. When the desired spring force has been attained, the push-pull adjusting knob 15 is then pushed towards the valve stem 38 and valve bonnet 16, thereby engaging the internal ribs 54 on the knob with the external spline 55 on the valve bonnet 16 to lock the adjusting knob against further rotation, as shown in FIG. 2. The O-ring detent 58 retains the knob in the locked position, acting against an internal shoulder 59 on the inner knob sleeve 52.

The foregoing construction provides a simple, unique lockable push-pull adjusting knob for a fluid pressure regulator such as a compressed air pressure regulator. While an illustrative preferred embodiment of the present invention has been shown in the drawings and described above in considerable detail, it should be understood that there is no intention to limit the invention to the specific form disclosed. On the contrary, the intention is to cover all modifications, alternatives, constructions, equivalents, and uses falling within the spirit and scope of the invention as expressed in the appended claims.

I claim:

1. In a pressure regulator for fluid pressure lines, the regulator including a valve body housing a pressure regulator valve, a valve stem rotatably housed in a bonnet mounted on said valve body for adjusting said valve, and a knob in rotational engagement with said valve stem for rotating the same, the improvement comprising means mounting said knob for sliding movement on said valve stem and means on said knob releasably and slidably engagable with said bonnet for selectively preventing rotation of said knob.

2. In a pressure regulator as defined in claim 1, the improvement further comprising a detent between said knob and said valve stem for releasably restraining said knob against axial movement relative to said valve stem.

3. In a pressure regulator as defined in claim 1, wherein said means on said knob releasably and slidably engageable with said bonnet comprises an external spline on said bonnet selectively engageable with an internal spline on said knob.

4. In a pressure regulator as defined in claim 1, the improvement further comprising a cap on said valve stem engageable with said knob when said knob is moved to disengage the releasable engagement means with said bonnet and for restraining said knob against removal from said valve stem.

5. In a pressure regular for controlling the pressure in fluid pressure lines, said regulator including a valve body housing a pressure regulator valve, a bonnet mounted on said valve body and rotatably housing a valve stem for adjusting said valve, and a handle mounted on said valve stem in rotational engagement therewith, the improvement comprising means mounting said handle for axially sliding movement on said valve stem, means on said handle releasably and slidably engageable with said bonnet for selectively preventing rotation of said handle, means on said valve stem for preventing sliding movement of said handle off of said valve stem, and a detent for releasably restraining said handle for movement on said valve stem between a locked position and an unlocked position.

6. In a pressure regulator as defined in claim 5, wherein said detent comprises an O-ring on said valve stem, engageable with a shoulder on said handle.

7. In a pressure regulator for controlling the pressure in fluid pressure lines, said regulator including a valve body housing a pressure regulating valve, a bonnet mounted on said valve body and rotatably housing a valve stem for adjusting said valve, and a knob mounted in rotational engagement with said valve stem for rotating said stem to adjust said valve, the improvement comprising means mounting said knob for axial sliding movement on said valve stem, an external spline on said bonnet, said knob being sleeve-shaped and defining on its internal surface a spline releasably and slidably engageable with said bonnet spline, said splines being engageable for selectively preventing rotation of said knob and thereby said valve stem, and said splines being separable upon axial movement of said knob on said valve stem for releasing said knob for rotation relative to said bonnet for adjusting said valve stem and the valve associated therewith.

8. A knob mechanism for an adjustable pressure regulator having a rotatable valve stem suppported in a bonnet mounted on the valve body, said knob comprising a sleeve defining an external gripping surface and an internal surface adapted for mounting in juxtaposition with said bonnet, an internal annular shoulder in said sleeve adapted for slidable mounting on said valve stem and rotatably engageable therewith, an external spline on said bonnet, an internal spline in said sleeve adjacent said shoulder, said splines being engageable upon axial movement of said sleeve on said valve stem, and means on said valve stem for preventing removal of said sleeve therefrom when said splines are disengaged and said knob is in position for rotating said valve stem.

9. A knob as defined in claim 8, wherein said knob further includes an internal sleeve extending generally parallel to said knob sleeve and secured to the inner edge of said shoulder, said sleeve defining a hexagonal surface for engagement with a corresponding hexagonal surface on said valve stem for rotating the same, and a detent on said valve stem for retaining said knob sleeve in one of two axial positions relative to said valve stem, said knob in one of said positions being engaged with said bonnet and in the other of said positions being free of said bonnet for rotation with respect thereto.

* * * * *